(No Model.)
A. KAYSER.
EVAPORATOR.
No. 291,520. Patented Jan. 8, 1884.
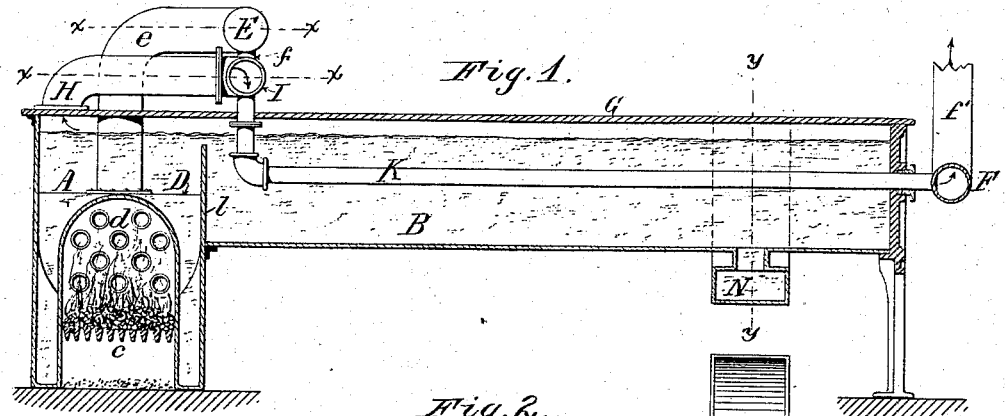
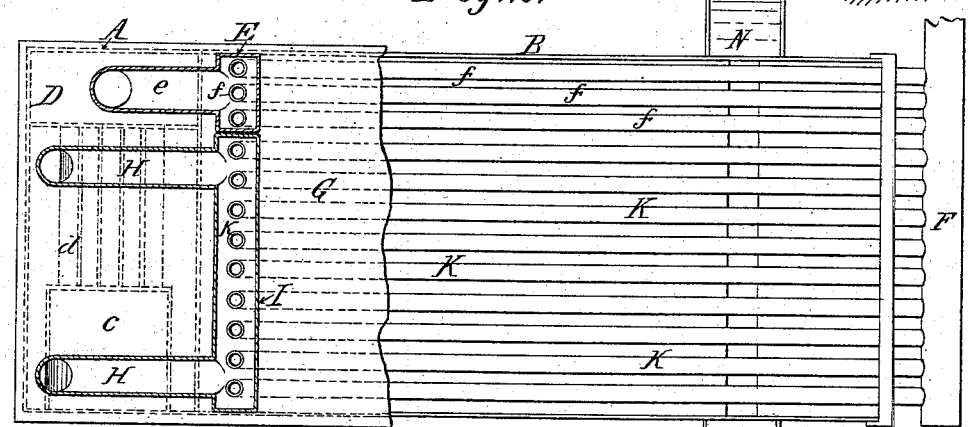
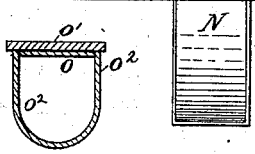
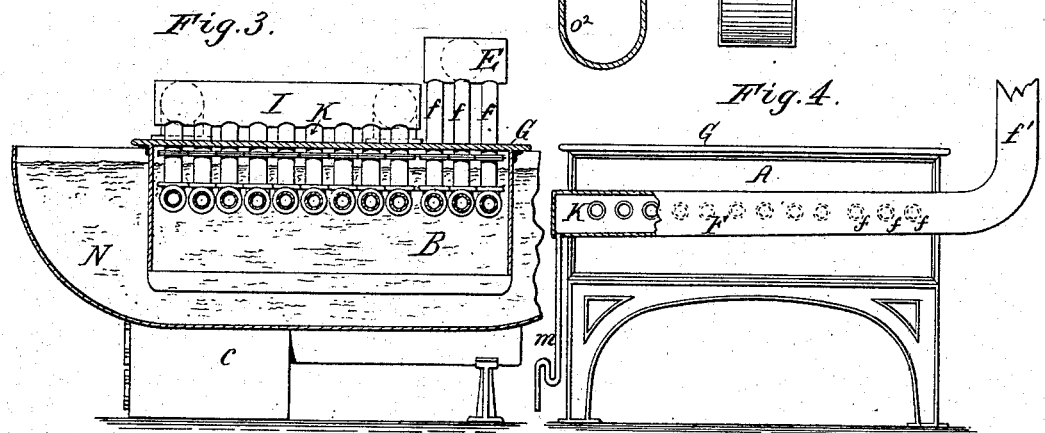
Witnesses: Chas. J. Buchheit, Theo. L. Popp.
Adolf Kayser, Inventor.
By Wilhelm & Bonner, Attorneys.

UNITED STATES PATENT OFFICE.

ADOLF KAYSER, OF BUFFALO, NEW YORK, ASSIGNOR OF ONE-HALF TO ALBERT B. YOUNG, OF SAME PLACE.

EVAPORATOR.

SPECIFICATION forming part of Letters Patent No. 291,520, dated January 8, 1884.

Application filed April 23, 1883. (No model.)

*To all whom it may concern:*

Be it known that I, ADOLF KAYSER, of the city of Buffalo, in the county of Erie and State of New York, have invented a new and useful Improvement in Evaporators, of which the following is a specification.

This invention relates to the construction of an evaporating apparatus for brine, saccharine solutions, and other liquids, in which the heat supplied thereto is more completely utilized in the evaporation of the liquid than in the evaporating apparatus now in use.

In evaporating liquids the heat which has been utilized in effecting the evaporation is contained in latent form in the steam or vapor which is generated.

The object of my invention is to recover and utilize the heat contained in this steam or vapor, and this object is accomplished by collecting the steam or vapor and conducting it through the cooler portion of the evaporating pan or vessel, where the steam or vapor is condensed and its heat given off to the surrounding liquid.

My invention consists, to that end, of the improvements which will be hereinafter fully set forth, and pointed out in the claims.

In the accompanying drawings, Figure 1 is a longitudinal sectional elevation of an apparatus designed for the evaporation of brine, and containing my invention. Fig. 2 is a top plan view thereof with the upper portion in section, the plane of section being in line $x\ x$, Fig. 1. Fig. 3 is a cross-section in line $y\ y$, Fig. 1. Fig. 4 is an elevation of the rear end of the apparatus. Fig. 5 is a cross-section of one of the condensing-pipes.

Like letters of reference refer to like parts in the several figures.

A represents the compartment of the evaporating pan or vessel to which direct heat is applied, and B represents the compartment of the pan to which indirect heat is applied by means of the steam or vapor derived from the liquid. The compartment A may be heated by a direct fire, as represented in the drawings, or by steam, hot air, or any other suitable heating agent.

$c$ represents the furnace, arranged in or under the compartment A, for heating the liquid in the same, and $d$ represents the flues, which extend from the furnace $c$ to the rear end of the compartment A, where they open into a smoke-chamber, D.

$e$ represents a smoke-pipe connecting the smoke-chamber D with a manifold head, E, which is arranged over the compartment B; and $f$ are smoke-pipes extending from the manifold head E through the liquid in the compartment B to a chamber or manifold head, F, at the rear end of the apparatus. The head F connects with a chimney, $f'$, or a suction-fan or other draft device, as may be preferred, and whereby the hot air and products of combustion are drawn through these passages.

G represents a cover, which is applied to the compartments A and B of the evaporating-vessel, and which prevents the escape of the steam or vapor.

H represents steam or vapor conduits, which are secured to the cover G above the compartment A, and connect the vapor-space of the same with a manifold head, I, arranged above the compartment B.

K represents the condensing-pipes, which descend from the manifold head I into the compartment B, and extend through the latter at a suitable height above the bottom of the compartment, so that these pipes are surrounded by the liquid in the compartment. The rear ends of the pipes K open into the manifold head or chamber F, by which they are connected with the chimney or other draft device.

$l$ represents the partition which separates the compartment A from the compartment B. This partition reaches to within a short distance of the water-level, and permits the hot liquid to flow over its upper edge at $l'$ into the compartment B, while it prevents the return of the cool liquid into the compartment A. If desired, the compartments A and B may be constructed separately and connected by suitable pipes, whereby this movement of the liquid from one compartment into the other is effected.

When the apparatus is employed for evaporating brine in the manufacture of salt, the fresh brine is continuously admitted to the heating-compartment A at its lowest point. The brine becomes heated in this compartment and flows over the partition $l$ into the compartment B. When the brine is fed into the compartment A in a hot state, the partition $l$ may be omitted. The vapor or steam rising from the liquid is prevented from escaping by the cover G and drawn along the surface of the brine toward the hottest point of the pan by the draft created by the chimney or other draft device. The vapor enters the pipes H and passes through the head I into the condensing-pipes K. In the latter it is subjected to the cooling influence of the liquid in the compartment B, whereby the steam or vapor is condensed and the heat contained therein imparted to the surrounding liquid. The pipes K are made so long that the greater portion of the steam and vapor is condensed therein, and the pipes are slightly inclined toward the chamber F, so that the condensed water is discharged into the head F from the pipes K. When a fan is employed, the pipes K may be made so long that the vapor is almost entirely condensed in passing through the same. The bottom of the head F is slightly inclined away from the chimney $f'$, to prevent the ashes from following the condensed water, and the head F is provided at its lower end with a trapped discharge-pipe, $m$, through which the condensed water is discharged. The brine becomes concentrated in the compartment B and deposits sulphate of lime nearest the compartment A, and farther on in the compartment B the salt is deposited on the bottom of this compartment, from which it is removed into a transverse trough, N, by suitable rakes operating below the condensing-pipes K. The mother-liquor is drawn off from the coldest end of the compartment B from time to time, as may be necessary. The compartment B may be entirely constructed of wood when used for evaporating brine, and the compartment A, when constructed of metal, is protected by a suitable non-conducting covering to prevent radiation of heat. The connecting-pipes are similarly protected. The condensing-pipes are preferably constructed, as represented in Fig. 5, with flat tops $o$, protected by a wooden cover, $o'$, so that the salt which may be deposited on the pipes can be readily scraped off without injuring the pipes, while the receding sides $o^2$ of the pipes prevent any deposit of salt on the same, thereby maintaining the heating-surfaces of the pipes at the same degree of efficiency at all times.

It is obvious that the heat employed in evaporating the liquid is recovered and utilized again in the same measure as the steam or vapor is condensed in the pipes K, so that upon taking proper care to reduce the losses by radiation, friction, and outgoing products of combustion to a minimum, and condensing the generated vapors, so far as this is practicable, the evaporating capacity of the apparatus for a given quantity of fuel will be very high and much greater than in any known apparatus. If desired, air may be admitted in a limited quantity to the vapor-space by a suitable register or damper below the cover G at the coolest end of the compartment B; but the apparatus will operate satisfactorily without any air-supply.

Instead of condensing the vapor or steam in the pipes K passing through the liquid in the compartment B, it may be conducted through passages or chambers arranged under the bottom of the compartment B, in which case the bottom is of course constructed of metal, in order to transmit the heat given off by the condensed vapor to the liquid in the compartment.

When the apparatus is employed for concentrating saline or other solutions in which the dissolved substance is more soluble at a higher temperature, the liquid is preferably supplied at the coolest place of the pan or evaporating-vessel, and drawn off at its hottest place.

My improved apparatus may also be employed for distilling oil and other liquids by placing the liquid to be distilled in the evaporating-vessel and collecting the distillate in the condensing-pipes K. The latter may be provided with a series of draw-off cocks arranged at different distances from the hottest point of the evaporating-vessel, in order to draw off the different distillates separately.

I claim as my invention—

1. The combination, with an evaporating pan or vessel, of a heating apparatus whereby a portion of said pan is heated, while another portion thereof remains comparatively cool, a cover which extends over the cool as well as the hot portion of the pan, and whereby the steam or vapor rising from all portions of the pan is collected, and a conduit which conducts the collected steam or vapor through or under the cooler portion of the pan, and in which the steam or vapor is condensed and its heat transmitted to the surrounding liquid, substantially as set forth.

2. The combination, with the compartments A and B, separated by a partition, $l$, having an overflow, $l'$, of a heating apparatus whereby the compartment A is heated, a cover, G, and a vapor-conduit, K, substantially as set forth.

3. The combination, with the compartments A and B, of a conduit whereby the hot liquid is conducted from one compartment into the other, a heating apparatus whereby the compartment A is heated, and a conduit whereby the vapor rising from the liquid is conducted through or under the liquid contained in the compartment B, substantially as set forth.

4. The combination, with the compartment A, furnace $c$, and compartment B, of a cover, G, and smoke-pipes $f$ and vapor-pipes K, ar ranged in the compartment B, substantially as set forth.

5. The combination, with the evaporating-pan, of a cover, G, vapor-pipes H, manifold head I, vapor-pipes K, manifold head F, and chimney $f'$, substantially as set forth.

6. The combination, with an evaporating-pan, of heating-pipes constructed with flat tops and receding sides, and immersed in the liquid in the pan, substantially as set forth.

A. KAYSER.

Witnesses:
 THEO. L. POPP,
 CHAS. F. GEYER.